United States Patent [19]
Bonomi

[11] Patent Number: 5,365,759
[45] Date of Patent: Nov. 22, 1994

[54] LOCKING DEVICE IN THE CLOSING OR OPENING POSITION OF A VALVE

[75] Inventor: Silvio Bonomi, Vale Bornata, Italy

[73] Assignee: Rubinetierie Utensilerie Bonomi S.r.l., Ciliverghe di Mazzano, Italy

[21] Appl. No.: 47,553

[22] Filed: Feb. 22, 1993

[51] Int. Cl.$^5$ .............................................. F16K 35/00
[52] U.S. Cl. ........................................ 70/177; 70/180; 137/385; 251/95
[58] Field of Search ..................... 70/175–180, 70/201–203, 209–212, 229, 232; 137/385; 251/95, 104, 110

[56] References Cited

U.S. PATENT DOCUMENTS

| | | | |
|---|---|---|---|
| 4,498,320 | 2/1985 | Mullis | 70/177 |
| 4,534,379 | 8/1985 | Burge | 70/180 X |
| 4,848,724 | 7/1989 | Pettinaroli | 70/177 X |
| 5,003,797 | 4/1991 | Wirth et al. | 70/180 |
| 5,014,528 | 5/1991 | Roberts | 70/177 |
| 5,052,655 | 10/1991 | Ackroyd | 70/175 X |
| 5,115,834 | 5/1992 | Champagne | 70/177 X |
| 5,165,263 | 11/1992 | Perron et al. | 70/177 |
| 5,183,073 | 2/1993 | Roberts | 70/177 X |
| 5,188,335 | 2/1993 | Pettinaroli | 70/177 X |

*Primary Examiner*—Peter M. Cuomo
*Assistant Examiner*—Suzanne L. Dino
*Attorney, Agent, or Firm*—McGlew and Tuttle

[57] ABSTRACT

A valve body with a retainer shoulder mounted on the side of the valve body. Inside the valve body is a valve obturator means which is rotatable inside the valve body and can open or block passages depending on the angle or position of the valve obturator means inside the valve body. A handle or lever is connected to the valve obturator means by a fastening means. A locking means is slidably mounted on the handle and has a stopping tooth which is positionable adjacent the retainer shoulder when the locking means is in a locked position. The stopping tooth and the retainer shoulder cooperate to block rotation of the handle when the locking means is in the locked position. The handle defines a bore which receives a bolt of a padlock. When the bolt of the padlock is in the bore, the locking means is prevented from moving out of the locked position.

16 Claims, 2 Drawing Sheets

LOCKING DEVICE IN THE CLOSING OR OPENING POSITION OF A VALVE

FIELD OF THE INVENTION

The present invention pertains, in general, to valves having an operating handle with a lever that can be adjusted from a closing position to an opening position by means of a 90° rotation, such as in ball valves. More specifically, the present invention is intended as a locking device for the operating lever and, through this lever, of the valve obturator of the valves is secured either in the closing position or in the opening position with the aid of a padlock.

BACKGROUND OF THE INVENTION

A locking of the operating lever with the valve body by means of a padlock in order to prevent the uncontrolled opening or closing of the valve for purposes of safety and against tampering of the unit, has already been proposed for such valves. A locking element is wedged onto the operating lever, and according to the known method. When it is secured by means of the padlock, the locking element only achieves a bond of the lever with the valve body for preventing its rotation in any direction up to the time that the padlock is not removed and the element is shifted into the inoperative position. Nevertheless, such an element, even though it is functional with regard to the locking of the lever, has the serious shortcoming of leaving the means, usually a nut, which secures the lever itself on the working pin of the valve obturator, uncovered, and at any rate, exposed. Therefore, although locked in the closing or opening position, the lever can be literally disassembled by removing the nut, and therefore, it leaves open a possibility of tampering with the valve, since, with the lever removed, the valve obturator can be rotated.

SUMMARY AND OBJECTS OF THE PRESENT INVENTION

On the contrary, the scope of the present utility model is to find a solution for such a shortcoming by eliminating any possibility of tampering with the valve and any access to its obturator by inappropriate and inadmissible handling.

In practice and in accordance with the present utility model, the locking device proposed here consists of a locking element which slides on the lever. When, the locking element is in the operating position and secured by a padlock, in addition to locking the lever in the desired position, the locking element extends to cover the fastening nut of the lever on the obturator pin. In this manner, the lever can neither be rotated nor disassembled for access and removal of the nut. This guarantees absolute safety and prevents tampering with the closed or opened valve, which is contrary to that which occurs with the known means which only lock the operating lever.

The present invention has a valve body with a retainer shoulder mounted on the side of the valve body. Inside the valve body is a valve obturator means which is rotatable inside the valve body and can open or block passages depending on the angle or position of the valve obturator means inside the valve body. A handle or lever is connected to the valve obturator means by a fastening means. A locking means is slidably mounted on the handle and has a stopping tooth which is positionable adjacent the retainer shoulder when the locking means is in a locked position. The stopping tooth and the retainer shoulder cooperate to block rotation of the handle when the locking means is in the locked position. The handle defines a bore which receives a bolt of a padlock. When the bolt of the padlock is in the bore, the locking means is prevented from moving out of said locked position.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
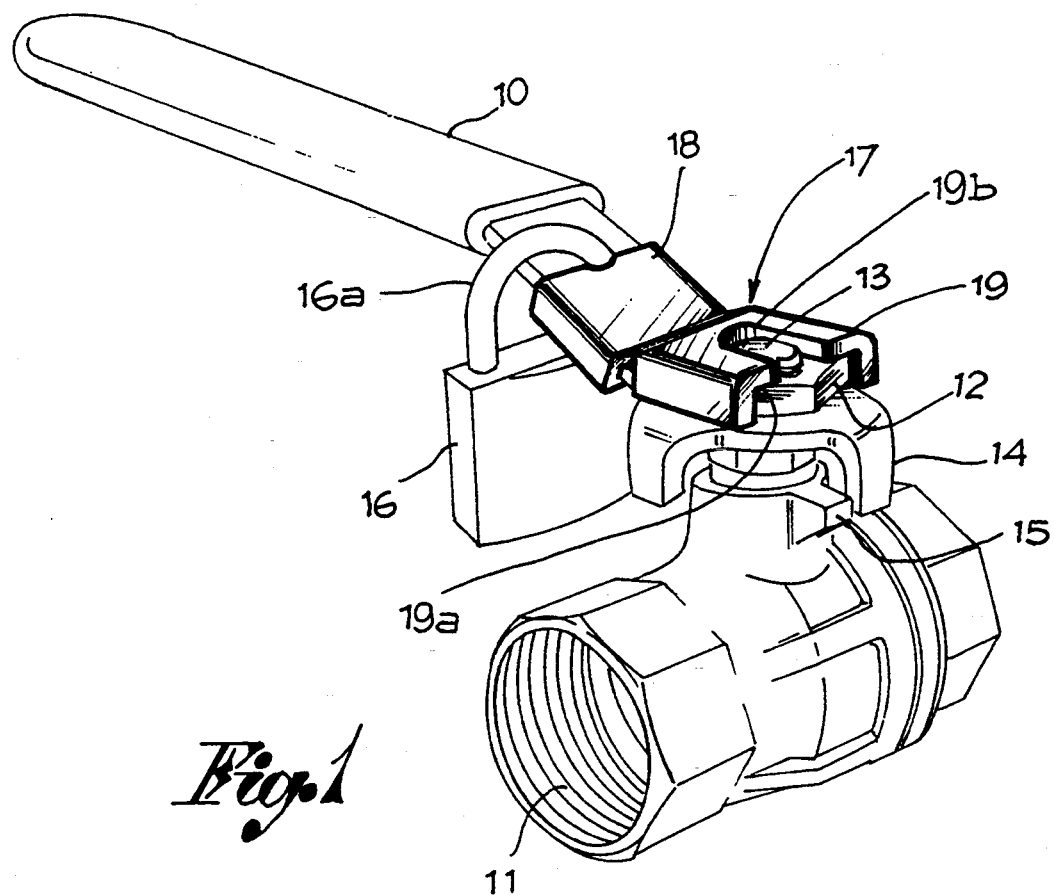
FIG. 1 and 2 show, from two opposite views, a valve with a handle and a locked lever (in the closed valve position)

In these drawings, the operating lever or handle 10 of a valve 11 is, attached by means of a nut 12 to the working shaft or pin 13 of the obturator (not shown), incorporated in the valve. The operating lever 10 has, in the known manner, at least one lever 14 tooth (two in the drawing), interacting with at least one retainer shoulder 15 for defining the opening and closing positions of the valve through a 90° rotation of the operating lever. The opening and closing positions can be stabilized, preferably with a locking device and with the use of a padlock 16 with key.

The locking device consists of an element 17 made from cutting and folding sheet metal and having: a tubular part 18, an upturned-U cover part 19 delimiting a groove-type seat 19a opened towards the bottom and one or two stopping teeth 20. The tubular part 18 has a section with a shape and dimensions corresponding to those of the operating lever 10 and is threaded and slides longitudinally on the lever itself. The upturned-U part 19 extends continuously from the tubular part 18 towards the shaft or pin 13 of the lever 10 and is intended for being superimposed on the nut 12 which fastens the lever to the pin. The sides delimiting the groove-type seat 19a are positionable on opposite sides of the nut. The upturned-U part 19 can also have a shaft groove 19b capable of accommodating the tip of the shaft or pin 13. Finally, the tooth (teeth) 20 of the element 17 are intended for interacting with one of the retainer shoulders 15 of the valve body 11 for preventing the rotation of the lever when the locking device is in the operating or locked position.

Figure 2:
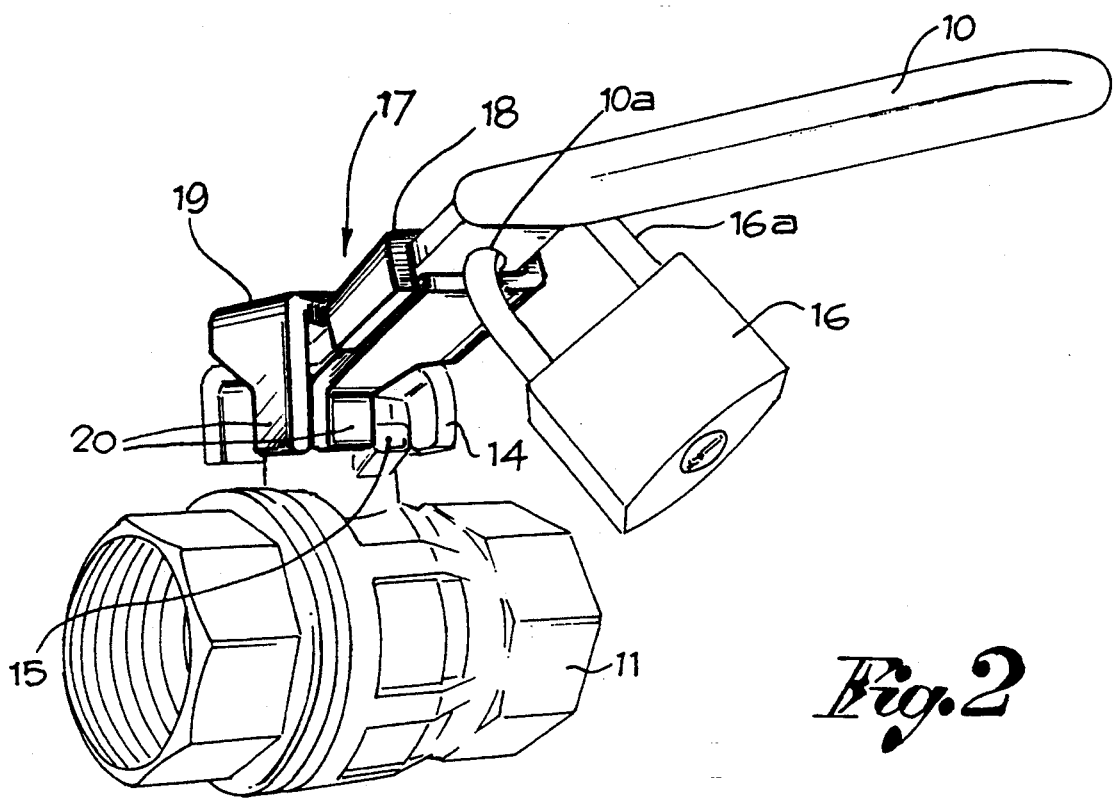
Figure 3:
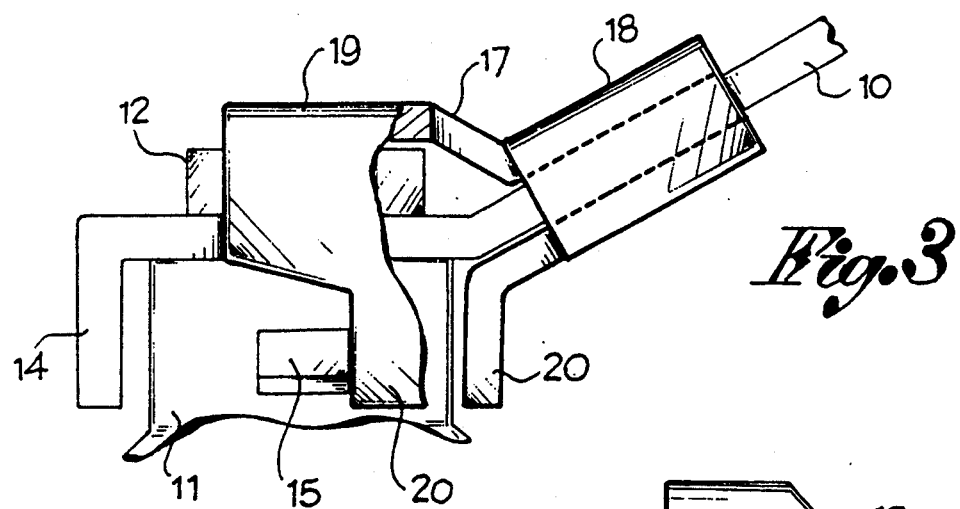
FIG. 3 shows a side view of the device set in operation.
Figure 4:
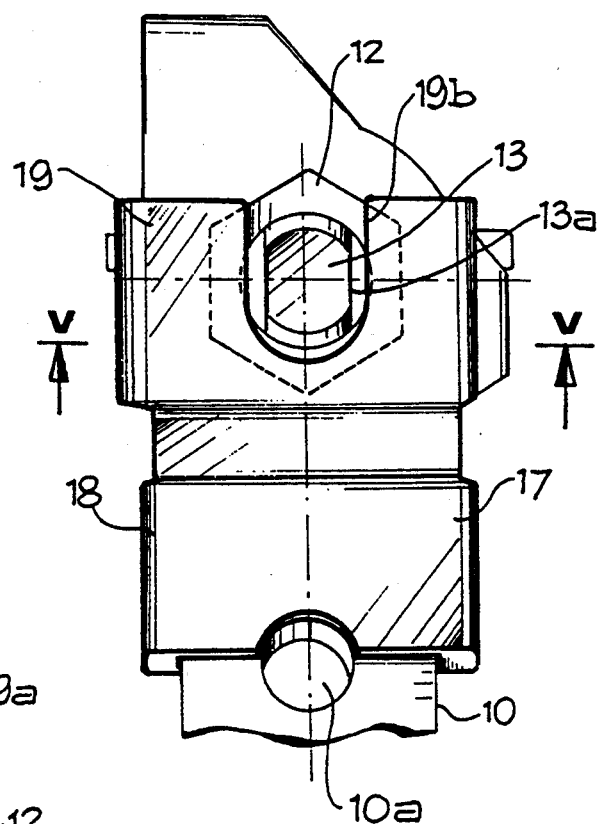
FIG. 4 shows a view of the device from the top.
Figure 5:
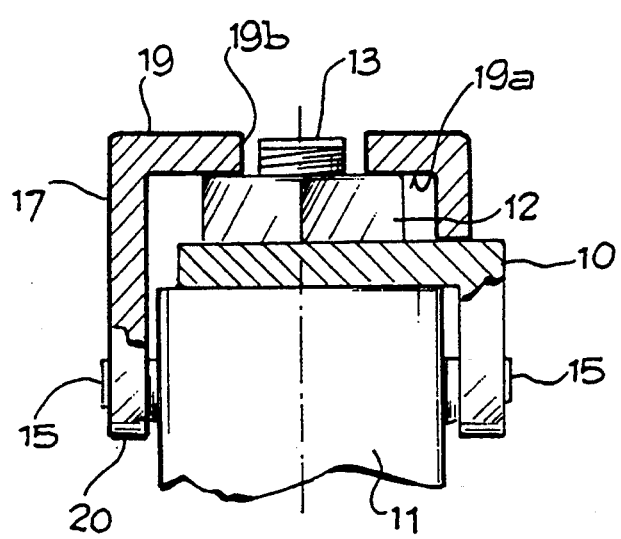
FIG. 5 shows a view in partial section according to the arrows V—V in FIG. 4.

This operating position, or locked position, is obtained by shifting the element 17 on the lever 10 forward towards the shaft or pin 13, and it can be obtained either in the closed valve position as shown in the drawings, in particular in FIGS. 1 and 2, or in the opened valve position.

When, when the element 17 is shifted forward, one of its stopping teeth 20 rests against one of the retainer shoulders 15 which is in one piece with the valve body, and at the same time, the part 19 of the element is superimposed on the nut 12.

Such a condition of the element is stabilized by means of the padlock 16, the bolt or arc 16a of which is made to pass in a hole 10a, if need be, made in the lever 10 in order to be behind the element when it is in the operating position.

Therefore, on the one hand, the stopping tooth 20 prevents any rotation of the lever in the operating direction of the obturator and, on the other hand, the part 19 covers the nut 12 on the top and the sides, by preventing its access and a possible, uncontrolled removal which could lead to the disassembling of the lever. Therefore, the valve is locked in the desired opening and closing position without the possibility of tampering or unlocking, and the operating of the valve can be performed only by putting the padlock key in place and after having removed the latter for shifting the element backwards, in the inoperative or unlocked position.

What is claimed is:

1. A locking valve comprising:
   a valve body;
   a retainer shoulder mounted on said valve body;
   valve obturator means rotatably mounted inside said valve body for opening and closing said valve body in different rotational positions;
   a handle connected to said valve obturator means, said handle including a lever tooth, said lever tooth being positioned to contact said retainer shoulder to block rotation of said handle;
   fastening means for connecting said handle to said valve obturator means;
   locking means slidably mounted on said handle for movement between a locked position and an unlocked position, and for securing said handle in a fixed position with respect to said valve body, said locking means also for enclosing said fastening means when said locking means is in said locked position, said locking means including a stopping tooth positionable adjacent said retainer shoulder to block rotation of said handle when said locking means is in said locked position, said locking means also including means for retaining said locking means in said locked position with a padlock, said locking means has a U-shaped part and a tubular part, said stopping tooth extends from said tubular part of said locking means.

2. A valve according to claim 1, wherein:
   said valve obturator is rotatable approximately 90 degrees;
   said retainer shoulder is integrally formed with said valve body;
   said handle is in the form of a lever;
   said fastening means includes a nut with one of a shaft or pin positioned at an end of said lever;
   said locking means is formed from sheet metal and slides longitudinally on said lever, and said locking means includes a cover part positionable over said nut when said locking means is in said locked position.

3. A valve according to claim 2, wherein:
   said cover part has a U-shape and defines a groove-type seat open towards said valve body, said groove-type seat having a side positionable adjacent said nut and blocking rotation of said nut when said locking means is in said locked position.

4. A valve according to claim 1, wherein:
   said fastening means includes a nut with one of a shaft and pin positioned at an end of said handle;
   said locking means includes cover part, and said cover part defines a shaft groove positionable around said one of said shaft and pin when said locking means is in said locking position.

5. A valve according to claim 1, further comprising:
   another retainer shoulder positioned on said valve body;
   said locking means also securing said handle in another fixed position, said another fixed position being rotationally spaced from said fixed position, said stopping tooth being positionable adjacent said another retainer shoulder and blocking rotation of said handle from said another fixed position when said locking means is in said locked position.

6. A valve according to claim 1, wherein: said lever tooth limits rotation of said handle and said valve obturator means between an open and closed position.

7. A valve according to claim 1, wherein:
   said valve body and said obturator means cooperate to form a ball valve.

8. A valve according to claim 1, wherein:
   said means for retaining said locking means in said locking position includes a bore defined by said handle, said bore receiving a bolt of the padlock.

9. A valve according to claim 1, wherein:
   said locking means has a U-shaped part and a tubular part;
   said stopping tooth extends from a leg of said U-shaped part.

10. A valve in accordance with claim 1, wherein:
    said lever tooth contacts one side of said retainer shoulder to block rotation of said handle in a first direction;
    said stopping tooth contacts another side of said retainer to block rotation of said handle in a second direction.

11. A valve in accordance with claim 10, wherein:
    said first and second directions are substantially opposite.

12. A locking valve comprising:
    a valve body;
    a retainer shoulder mounted on said valve body;
    valve obturator means rotatably mounted inside said valve body for opening and closing said valve body in different rotational positions;
    a handle connected to said valve obturator means;
    fastening means for connecting said handle to said valve obturator means;
    locking means slidably mounted on said handle for movement between a locked position and an unlocked position, and for securing said handle in a fixed position with respect to said valve body, said locking means also for enclosing said fastening means when said locking means is in said locked position, said locking means including a stopping tooth positionable adjacent said retainer shoulder and blocking rotation of said handle when said locking means is in said locked position, said locking means including a tubular part and a U-shaped part, said U-shaped part and said tubular part being integrally and non-detachably connected, said locking means also including means for retaining said locking means in said locked position with a padlock.

13. A valve in accordance with claim 12, further comprising:

another retainer shoulder mounted on said valve body and contacting said lever tooth to block rotation of said handle;

said stopping tooth also contacting said another retainer shoulder to block rotation of said handle.

14. A valve in accordance with claim 13, wherein:

said stopping tooth contacts said retainer shoulder to block rotation in a first direction;

said lever tooth contacts said another retainer shoulder to block rotation in a second direction.

15. A valve in accordance with claim 12, wherein:

said lever tooth and said retainer shoulder blocks rotation of said handle in a first direction and said handle includes another lever tooth contacting said retainer shoulder and blocking rotation of said handle in a second direction.

16. A locking valve comprising:

a valve body;

another retainer shoulder positioned on said valve body;

a retainer shoulder mounted on said valve body;

valve obturator means rotatably mounted inside said valve body for opening and closing said valve body in different rotational positions;

a handle connected to said valve obturator means, said handle including a lever tooth, said lever tooth being positioned to contact said retainer shoulder to block rotation of said handle;

fastening means for connecting said handle to said valve obturator means;

locking means slidably mounted on said handle for movement between a locked position and an unlocked position, and for securing said handle in a fixed position with respect to said valve body, said locking means also for enclosing said fastening means when said locking means is in said locked position, said locking means including a stopping tooth positionable adjacent said retainer shoulder to block rotation of said handle when said locking means is in said locked position, said locking means also including means for retaining said locking means in said locked position with a padlock, said locking means also securing said handle in another fixed position, said another fixed position being rotationally spaced from said fixed position, said stopping tooth being positionable adjacent said another retainer shoulder and blocking rotation of said handle from said another fixed position when said locking means is in said locked position, said locking means includes a cover part positionable over said fastening means when said locking means is in said locked position, said cover part having a U-shape and defining a groove-type seat open towards said valve body, said groove-type seat having two sides positionable adjacent said fastening means when said locking means is in said locked position, said locking means also including a tubular part slidable on said handle and positioned on an opposite side of said cover part from said fastening means, said stopping tooth having a portion on said cover part and another portion on said tubular part, said portion of said stopping tooth on said cover part blocking rotation from said fixed position and said portion of said stopping tooth on said tubular part blocking rotation from said another fixed position.

* * * * *